United States Patent
Brock

(10) Patent No.: US 6,227,603 B1
(45) Date of Patent: May 8, 2001

(54) PORTABLE CANOPY FOR GOLF CART REAR COMPARTMENT

(76) Inventor: Robert L Brock, 19533 SE. Jones Rd., Renton, WA (US) 98055

( * ) Notice: Subject to any disclaimer, the term of this patent is extended or adjusted under 35 U.S.C. 154(b) by 0 days.

(21) Appl. No.: 09/512,113

(22) Filed: Feb. 24, 2000

(51) Int. Cl.$^7$ ........................................ B60P 7/02
(52) U.S. Cl. ............................ 296/100.14; 296/100.01
(58) Field of Search .................... 296/136, 100.01, 296/100.14, 100.16, 100.17, 77.1, 79, 83, 107.02; 280/DIG. 5; 135/88.01; 150/159, 166, 167, 168

(56) References Cited

U.S. PATENT DOCUMENTS

| | | | | |
|---|---|---|---|---|
| 670,268 | * | 3/1901 | Braun | 296/107 |
| 780,141 | * | 1/1905 | Thomas | 296/107 |
| 956,563 | * | 5/1910 | Bertrand | 296/107 |
| 3,773,379 | * | 11/1973 | Loiseau | 296/107 |
| 4,681,362 | * | 7/1987 | Taylor | 296/78.1 |
| 4,830,037 | | 5/1989 | Held. | |
| 5,069,481 | * | 12/1991 | Strange | 280/DIG. 5 X |
| 5,072,987 | * | 12/1991 | Allen | 296/107 |
| 5,190,340 | | 3/1993 | Nuscher. | |
| 5,741,041 | | 4/1998 | Sullivan. | |

* cited by examiner

*Primary Examiner*—D. Glenn Dayoan
*Assistant Examiner*—Lori L. Coletta
(74) *Attorney, Agent, or Firm*—David L. Tingey

(57) ABSTRACT

A removable and portable golf cart canopy comprising a secondary frame foldable within a plane of a primary fame in a substantially vertical, storable position unfolds from the primary plane on pivot pins joining secondary plane side member ends intermediate primary plane side members as the primary frame separates to an acute angle from the cart roof with its ends rotating in a cart corner between a cart cabin and a cart golf bag compartment rearward of the cabin. A canopy cover drapes over the primary frame with a first side removably attached to the golf cart roof by flexible hook and loop tape. The primary and secondary frames are adjustable in length and width with extendable telescoping elements.

9 Claims, 5 Drawing Sheets

PORTABLE CANOPY FOR GOLF CART REAR COMPARTMENT

BACKGROUND

1. Technical Field

This invention generally relates to golf carts, and more specifically to a portable canopy removably attachable to a motorized golf cart to provide a cover over its rear compartment and golf club bags therein.

2. Prior Art

Motorized golf carts commonly have a seating cabin covered by a roof and an uncovered rear deck or compartment on which golf bags with clubs are transported. Thus, golfers within the cabin may be protected during rain but their golf clubs get wet. Wet, and therefore slippery, club grips become an annoyance to golfers, so they seek a means of keeping their clubs dry as well as themselves, such as a canopy over the golf bag compartment.

It is known in the art to have canopies for golf cart rear compartments. Generally, it advantageous for the canopy to unfold over and in close proximity to the clubs to minimize exposure to the weather. For example, U.S. Pat. No. 5,741,041 shows a portable, removable rear cover for an electric cart in the form of a flexible plastic sheet with a woven panel secured to the golf cart with shock cords. The cover drapes over the club bags in the golf cart compartment but requires the golfer to detach the shock cords on each cart side to access the golf bags. This is a nuisance to golfers who prefer the ease of quickly accessing the golf bag and clubs within preferably by simply lifting a cover from over the clubs. U.S. Pat. No. 4,830,037 describes a protective canopy for a motorized golf cart rear compartment that provides ease of access by simply lifting the cover on a frame from over the clubs in the compartment However, the flame is permanently mounted to the golf cart. Because the need for golf carts with rain protection for the clubs is not usual, it is preferred that the canopy be quickly attachable to and detachable from the cart as need arises. Thus, a golf cart facility might choose to reduce his costs by maintaining an inventory a smaller number of canopies than golf carts and attaching a canopy to a cart only upon request of a user.

Thus it is an object of the present invention to provide a portable, removable golf cart canopy for its rear golf cart compartment that can be easily opened by simply lifting up the canopy without detaching tying cords. It is another object that the portable, removable canopy by removable and portable. It is a further object that the canopy unfold over and in close proximity to the clubs in the cart rear compartment to minimize exposure to the weather. It is yet another object that the canopy be easily and quickly mounted to and removed from a golf cart. It is a still further object that the canopy be of general applicability, adjustable to fit on golf carts of different rear compartment design. It is a yet still further object that the canopy fame fold into a common plane to minimize protrusion into the rear compartment, avoiding inadvertent bumps on the frame which could damage the frame or knock it loose from the cart and also avoiding protruding brackets otherwise for mounting a canopy frame to the cart, eliminating snags and scrapes and other user injuries.

SUMMARY

These objects are achieved in a golf cart canopy with a primary frame having a base that rests in a cart transverse corner formed between the rear compartment deck and a vertical wall component between the cart cabin and the rear compartment. Clearly, the primary canopy frame base could also rest on a like corner formed between cart rear fenders or other nominally horizontal components at the rear compartment and the vertical wall component. A canopy cover is draped over the primary frame with a first side removably attached to the golf cart roof Typically, a first strip of flexible hook and loop tape is secured on the roof and another is secured on the cover first side, providing a grip that removably attaches the cover to the roof when brought into contact. The primary frame is adjustable in length on parallel side members with extendable telescoping elements to adjust to a distance between a chosen corner and the roof, or a preferred distance below the roof The canopy primary frame is also adjustable in width with a top member having telescoping elements between the side members at side member first ends, again to accommodate golf carts of various dimensional configurations.

A secondary frame, adjustable in width similar to the primary frame, also includes parallel first and second secondary frame side members spaced apart by a telescoping top therebetween. In a storage position, the secondary frame fits in folded disposition within the primary frame in a common plane defined by the primary frame vertically alongside the cabin between the cabin and the rear compartment with the cover with the primary frame base resting in the corner. In operational, or unfolded, disposition, the primary frame pivots on its base in the corner with the primary frame top member separating from cart roof, and the secondary frame pivots away from the primary frame on pivot pins pivotably connecting secondary frame second ends intermediate primary frame side members, respectfully. With cover first side attached to the cart roof and a cover second side attached along the secondary member top member, the cover becomes a limit to the degree the primary and secondary frame can separate from the roof and supports them as the cover draws taut between the roof and the secondary frame. Typically, the cover is of length sufficient to allow the secondary frame to fold to a near horizontal position. By design, the pivot pins are located on the primary frame side members in cooperation with the cover so that when the canopy is in operational position, the secondary frame and cover extend over the golf clubs in the compartment and partially over the golf club bags to at least cover the clubs exposed as they extend out of the golf club bags. With the secondary frame pivoting on the outside of the primary frame, area within the secondary frame is increased. Thus, as it folds over the golf club bags, the secondary frame is less likely to come down on the bags because more of the rear compartment is covered with the same fit or setting of the primary frame on the golf cart.

Thus, in operation, with the canopy in operational position, a user simply lifts the secondary top member up and toward the cart roof to access clubs within the rear compartment, which also lifts the primary frame back toward the cart roof The canopy can then remain folded back to the roof in stored position or lowered back to operational position.

DETAILED DESCRIPTION OF THE PROFFERED EMBODIMENT

Figure 1:
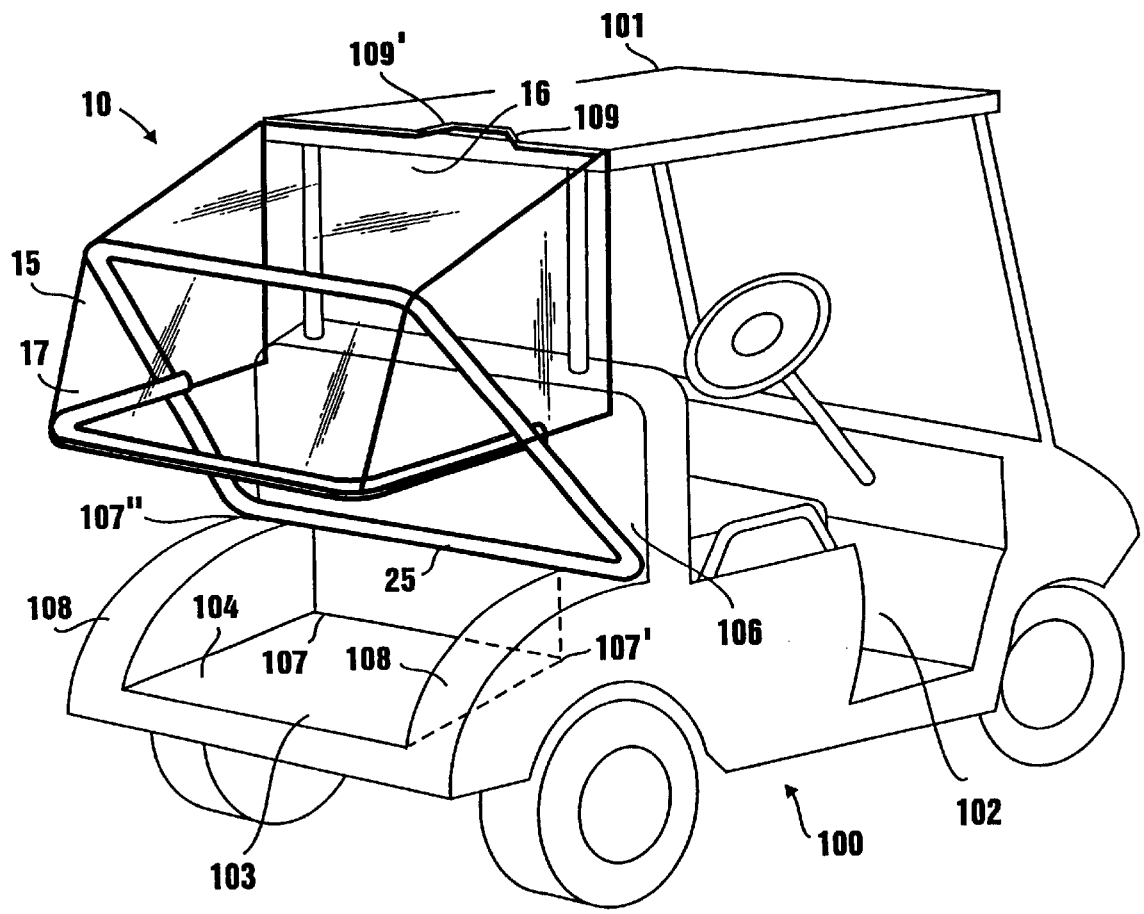
FIG. 1 is a perspective view of the canopy of the present invention in operational position in combination with a typical motorized golf cart.
Figure 2:
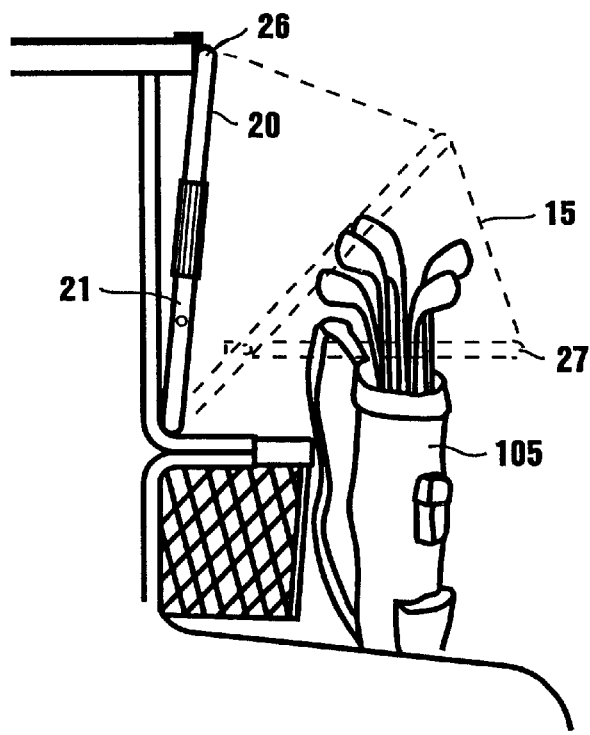
FIG. 2 is a side view of the canopy in folded position with the primary frame mostly vertical against the cart roof and the secondary frame in a common plane defined by the primary frame. Also shown is a phantom view of the canopy in fully operational, unfolded position over golf club bags in the cart rear compartment.
Figure 3:
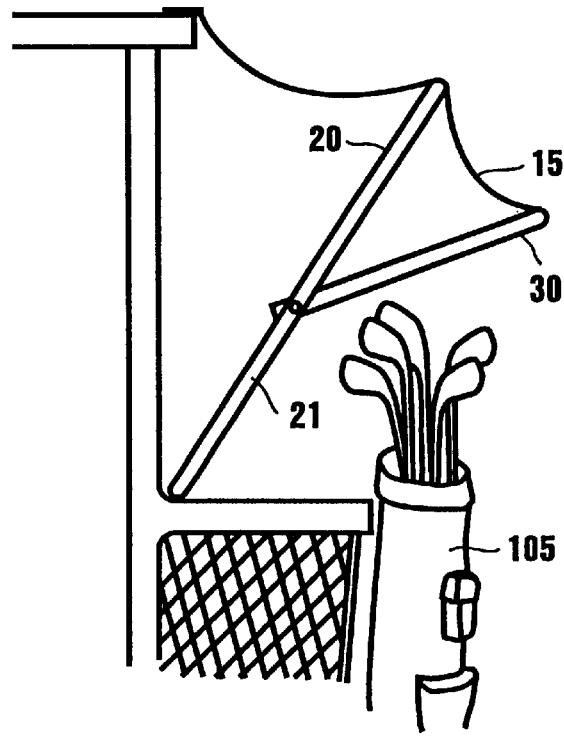
FIG. 3 is the side view of FIG. 2 with the canopy mostly unfolded over the golf club bags. Also shown is the canopy cover attached to the cart roof (with hook and loop tape) and draped over the primary frame to connection to the secondary frame.
Figure 4:
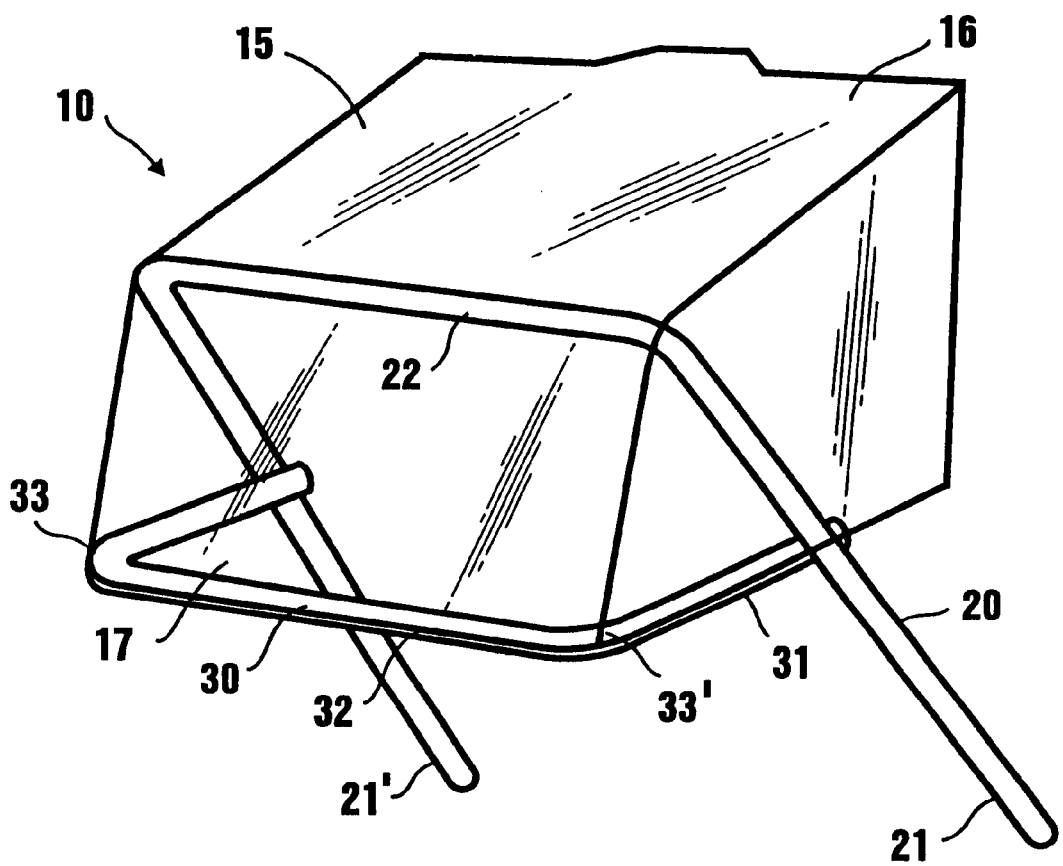
FIG. 4 is a perspective view of the canopy in unfolded, operational position supported on primary frame side member second ends with the canopy cover stretched taut over primary frame side member first ends
Figure 5:
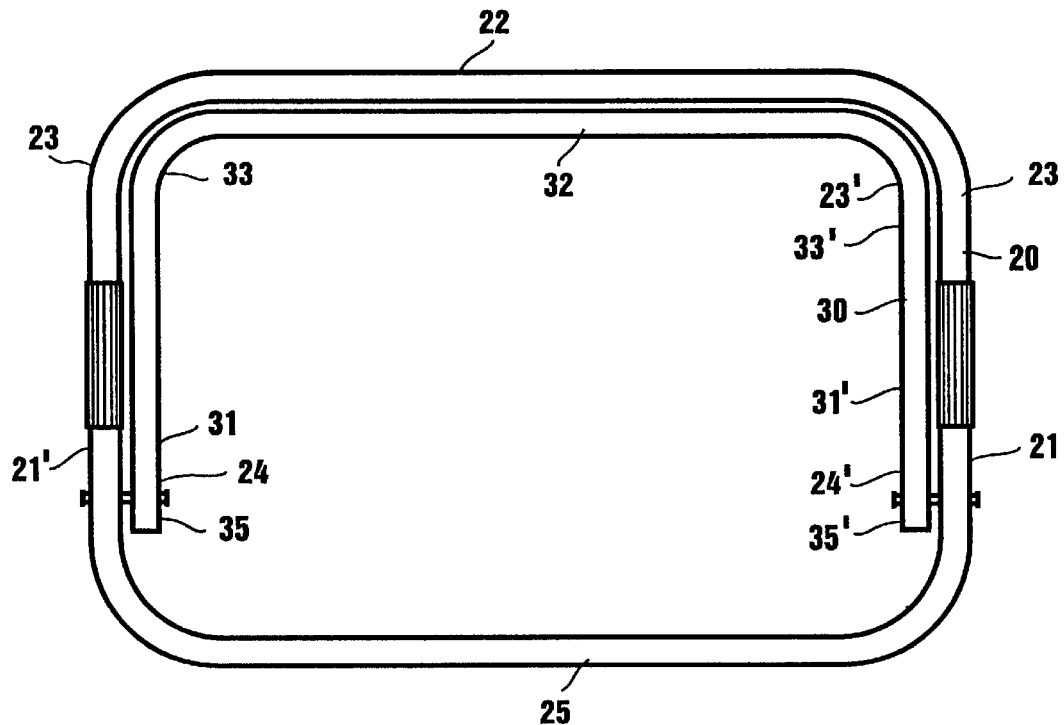
FIG. 5 is a is a front view of the canopy frame configured with the secondary frame inside the primary frame in a common plane, the secondary frame side members supported pivotably on pivot pins.
Figure 6:
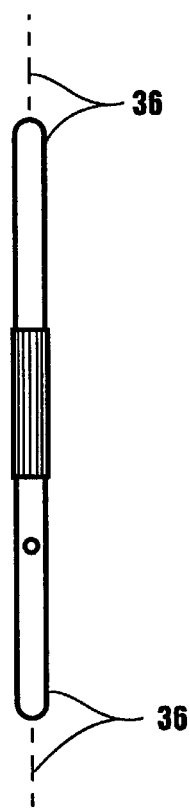
FIG. 6 is a side view of the canopy of FIG. 5 in stored, folded position.
Figure 7:
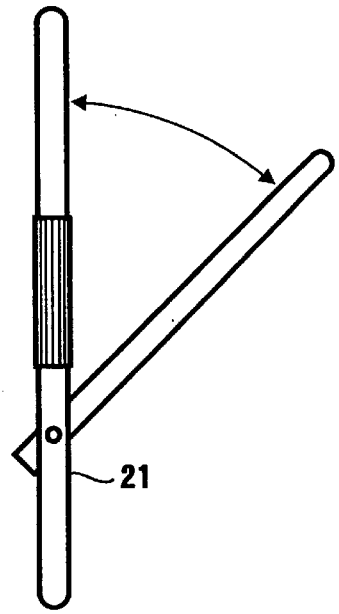
FIG. 7 is a side view of the canopy of FIG. 6 with the secondary frame pivoted out of the primary frame plane.
Figure 8:
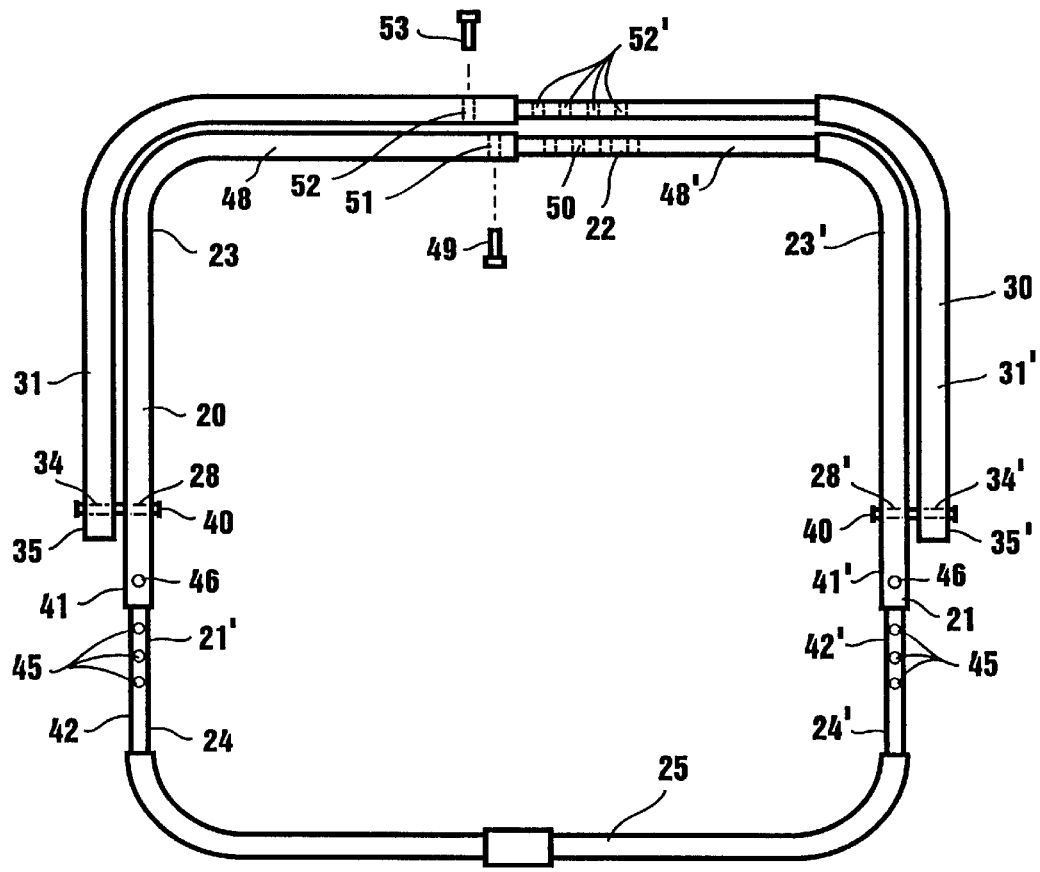
FIG. 8 is a front view of the canopy frame configured with the primary frame inside the secondary frame in a common plane.
Figure 9:
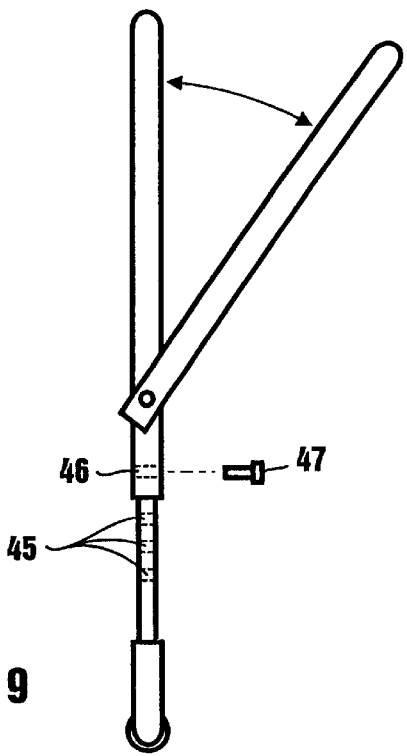
FIG. 9 is a side view of the canopy of FIG. 8 with the secondary frame pivoted out of the primary frame plane.

The canopy 10 of the present invention is intended to be used in combination with a golf cart 100 of the type having a roof 101 over a forward cabin 102 and a golf bag compartment 103 rearward of the cabin 102 over which the canopy 10 is secured. The golf bag compartment 103 comprises a deck 104 for receiving golf bags 105, a vertical wall member 106 between the golf compartment 103 and the cabin 102 forming a corner 107' with the deck 104 transverse to the golf cart 100. A corner 107" may also be formed between golf cart rear fenders 108 and the vertical wall member 106. Except as may be clear from the context, for simplicity herein, both will be referred to collectively as the golf cart transverse corner 107, or just corner.

The canopy 10 comprises a cover 15 over a primary frame 20 that includes first and second parallel primary frame side members 21, 21' separated by a primary frame top member 22 extending therebetween at first and second primary frame side member first ends 23, 23' and 33, 33'. Primary frame side member second ends 24, 24' extend for placement in the golf cart corner 107, which member adapted for placement in said corner 107 referred to generally herein as the primary frame base. A primary frame transverse base member 25 may extend between side member second ends 24, 24' forming an axis of rotation of the primary frame between its stored, or folded position 26 and its operational, or unfolded position 27. The primary frame 20 then rotates on the side member second ends 24, 24' or transverse primary frame base, member 25 placed unattached in the golf cart corner 107. The primary frame side members 21, 21' each have a pivot pin hole 28, 28' therethrough intermediate its length for pivotably mounting secondary frame 30 either inside or outside the primary frame 20.

The secondary frame 30 also includes first and second parallel side members 31, 31' separated by a top member 32 extending therebetween at side 33'. Secondary frame side members 31, 31' also each have pivot pin holes 34, 34' at secondary frame member second ends 35, 35' in alignment with primary frame side member holes 28, 28', respectively. A pivot pin 40 passes through each of said aligned holes, respectively, allowing the secondary frame to pivot on its side member second ends intermediate primary frame side members.

The pivot pin and pivot pin holes are in a common line so that the primary frame and secondary frame pivot between its folded position 26 in a common plane 36 defined by the primary frame members and its operational, unfolded position 27 with the secondary frame 30 pivoting away from the primary frame 20 on the pivot pins. (It is recognized that the common plane is technically better defined as that plane passing through the longitudinal centers of primary frame members, and the plane passing through the longitudinal centers of secondary frame members rotates into that common plane. However, for simplicity, thickness of the primary plane and secondary plane members will be ignored in this description and be described as if there were no thickness in the frames.)

The cover 15 drapes over the canopy primary frame 20 with a first side 16 removably attached transversely along the golf cart roof 101. A second cover side 17 removably attaches transversely along the secondary frame top member 32 over the primary frame top member 22. Typically, a first strip 109 of hook and loop tape is mounted to the cart roof and a second, matching strip 109' of hook and loop tape is attached to the cover first side 16. When the strips are brought into meshing contact, they mutually grasp, therein securing the cover to the roof In operation, the canopy 10 is operationally mounted removably to the golf cart by inserting the primary frame base into the golf cart corner and removably attaching the cover to the cart roof When the canopy remains in stored position, it rests with the frames tucked together in the common plane transverse to the golf cart between the golf cart cabin and the rear compartment alongside the vertical wall member. The primary frame with secondary frame attached moves from its stored position to its operational position by rotating the primary frame on its base away from the roof rearward over the golf cart compartment. The secondary frame pivots out of the common plane on the pivot pins away from the primary frame as the cover stretches taut over the primary frame until the cover limits further unfolding movement.

So that the primary frame side member can adjust in length from its base in a corner on the compartment deck or in a corner on the cart fenders, or the like, the primary frame side members each comprise telescoping first and second elements 41, 42 and 41', 42'. One of the elements has a plurality of transverse holes 45 therethrough and the other has a similar transverse hole 46 alignable with one of said plurality of transverse holes such that the primary frame top member is extendable on the telescoping elements to a selective position, such as a preferred distance from the cart roof. An adjustment pin 47 passes through the aligned holes to secure the telescoping elements at the selective position.

So that the canopy can adjust laterally for differences in cart width, and specifically for differences in the rear compartment width, the primary frame top member similarly comprises telescoping first and second elements 48, 48', one with a plurality of transverse holes 50 therethrough and the other with a similar transverse hole 51 alignable with one of said plurality of transverse holes such that the primary frame third member is adjustable in length and an adjustment pin 49 removably passing through the aligned holes. Similarly, the secondary frame comprises telescoping first and second elements 54 and 54', one with a plurality of transverse holes 52' therethrough and the other with a similar transverse hole 52 alignable with one of said plurality of transverse holes such that the secondary frame third member is adjustable in length with an adjustment pin 53 removably passing through the aligned holes. Lateral adjustment of the canopy is facilitated in the described simple configuration because the primary and secondary frames are in a common plane supported by the pivot pins also in the plane.

Clear advantages disclosed by this invention include first that the first and secondary planes are by design disposed in a common plane, at least partially, to easily accommodate lateral adjustment which would be more difficult in different configurations, such as with the secondary frame in a plane parallel to the primary frame. A further inherent advantage is with the base unattached to the cart corner between the rear compartment and the cabin, the canopy can rotate freely yet be readily removable without encumbering brackets. With the sole attachment of the canopy being the canopy cover to the cart roof, the canopy is very easily mounted to and removed from the cart. Another clear advantage by design is that the primary side members are adjustably extendable down to the compartment deck or to the fender-wall corner, below the horizontal level to which the frame unfolds to cover golf clubs within the compartment. Thus, the primary frame folds to a near vertical plane between the cabin and the rear compartment and unfolds to an acute angle from vertical with its top member above the compartment, intermediate the deck. It is therefore a design advantage to provide the secondary frame that pivots down and away from the primary frame from its position intermediate the deck to a more rearward deck position and downward from the primary top member to cover the clubs. It is recognized that some carts have a pair of vertical posts that may support the roof, often comprising two segments that join together midway its length with a horizontal components at their joinder (for receiving securing bolts and the like) forming a corner. Clearly, with the adjustable primary frame side members, the base could be adjusted for positioning in that corner as well as the other described corners between the cabin and the rear compartment.

One skilled in the art will recognize these and other advantages taught by this invention and illustrated by the preferred embodiment presented. These and other obvious applications and extensions of the invention are intended to be within the spirit and scope of this invention.

Having described the invention, what is claimed is as follows:

1. The combination of a golf cart and a canopy, the golf cart of the type having a roof over a forward cabin and a golf bag compartment rearward of the cabin over which the canopy is secured, the golf bag compartment comprising a deck for receiving golf bags, a vertical wall member between the golf bag compartment and a corner transverse to the golf cart formed by the vertical wall member and a horizontal member extending toward the golf bag compartment, the improvement comprising in the canopy, a primary frame including a primary frame first side member and a primary frame second side member, each having a length, said primary frame side members in parallel and separated by a primary frame top member extending therebetween at primary frame first and second side member first ends, said primary frame first side member and primary frame second side member having a pivot pin hole intermediate their respective lengths, a secondary frame including a secondary frame first side member and a secondary frame second side member each having first and second ends, said secondary frame side members in parallel and separated by a secondary frame top member extending therebetween at secondary frame first and second side member first ends, each of said secondary frame side members having a pivot pin hole at secondary frame member second ends, said pivot pin holes of primary and secondary frame first side members in alignment and said pivot pin holes of primary and secondary frame side members, in alignment, a pivot pin passing through each of said pivot pin holes of primary and secondary frame first members and said pivot pin holes of primary and secondary frame second members, a cover with a first side removably attached transversely along the golf cart roof and a second side attached along the secondary frame top member, the cover draped over the primary frame top member, means for removably attaching the cover first side to the golf cart roof, wherein the primary frame, the secondary frame, the pivot pin and the pivot pin holes are all in a common plane defined by the primary frame first side member and primary frame second side member, with the secondary frame mounted pivotably on said pivot pins in a storable or folded position in said common plane with the primary frame first and second member second ends extending to said corner, the primary and secondary frames pivotable between said folded position disposed substantially vertically between the cabin and the golf bag compartment and an operational or unfolded position with the primary frame leaning away from the roof rearward over the golf bag compartment with primary frame member second ends urged into said corner and with said secondary frame pivoting out of the primary frame common plane on said pivot pins away from the primary frame, the cover stretching taut over the primary frame.

2. The combination of claim 1 further comprising a primary frame base member extending between the primary frame first and second member second ends forming a rectangular closed frame with said base member urged into said corner and forming an axis of rotation of the primary frame between folded and unfolded positions.

3. The combination of claim 1 wherein primary frame first and second side members each comprise telescoping first and second elements, one telescoping element with a plurality of transverse holes therethrough and the other telescoping element with a similar transverse hole alignable with one of said plurality of transverse holes such that the primary frame top member is extendable on the telescoping elements to a selective position away from the primary frame first and second member second ends, and further comprising a pin removably passing through said similar transverse holes and one of said plurality of transverse holes.

4. The combination of claim 1 wherein secondary frame first and second side members each comprise telescoping first and second elements, one telescoping element with a plurality of transverse holes therethrough and the other telescoping element with a similar transverse hole alignable with one of said plurality of transverse holes such that the secondary frame first and second members are adjustable in length and further comprising a pin removably passing through said similar transverse holes and one of said plurality of transverse holes.

5. The combination of claim 1
wherein said primary frame top member comprises telescoping first and second elements, one telescoping element with a plurality of transverse holes therethrough and the other telescoping element with a similar transverse hole alignable with one of said plurality of transverse holes such that the primary frame top member is adjustable in width, and further comprising a pin removably passing through said similar transverse holes and one of said plurality of transverse holes.

6. The combination of claim 1 wherein the primary frame fits inside a perimeter of the secondary frame in said folded position.

7. The combination of claim 1 wherein the secondary frame fits inside a perimeter of the primary frame in said folded position.

8. A removable golf cart canopy adapted to cover a golf bag compartment of a golf cart of the type having a roof over a forward cabin and a golf bag compartment rearward of the cabin over which the canopy is secured, the golf bag compartment comprising a deck for receiving golf bags with a vertical wall member between the golf ba compartment and the cabin and a corner transverse to the golf cart formed by the vertical wall member and a horizontal member extending toward the golf bag compartment, the canopy comprising, a primary frame including a primary frame first side member and a primary frame second side member, each having a length, said primary frame side members in parallel and separated by a primary frame top member extending therebetween at primary frame first and primary frame second side member first ends, said primary frame first side member and second side member having a pivot pin hole intermediate their respective lengths, a secondary frame including secondary frame first side member and secondary frame second side member each having first and second ends, said secondary frame side members in parallel and separated by a secondary frame top member extending therebetween at secondary frame first and second side member first ends, each of said secondary frame side members having a pivot pin hole at secondary frame member second ends, said pivot pin holes of primary and secondary frame first side members in alignment and said pivot pin holes of primary and secondary frame side members in alignment, a pivot pin passing through each of said pivot pin holes of primary and secondary frame first members and said pivot pin holes of primary and secondary frame second members, a cover with a first side removably attachable transversely along the golf cart roof and a second side attached along the secondary frame top member, the cover draped over the primary frame top member, means for removably attaching the cover first side to the golf cart roof, wherein the primary frame, the secondary frame, the pivot pin and the pivot pin holes are all in a common plane defined by the primary frame first side member and primary frame second side member, with the secondary frame mounted pivotably on said pivot pins in a storable or folded position in said common plane with the primary frame first and second member second ends extending downward, the primary and secondary frames pivotable between said folded position and an operational or unfolded position with said secondary frame pivoting out of the primary frame common plane on said pivot pins away from the primary frame, the cover stretching over the primary frame.

9. The canopy of claim 8 wherein the means for attaching the cover first side to the golf cart roof includes tape hook and eye tape comprising a strip of resilient microhooks and a matching strip of resilient microloops, or eyes, into which the microhooks removably attach, with a first strip attachable to the golf cart roof and a second strip attached to the cover first side opposite the first strip.

\* \* \* \* \*